United States Patent Office 3,534,493
Patented Oct. 20, 1970

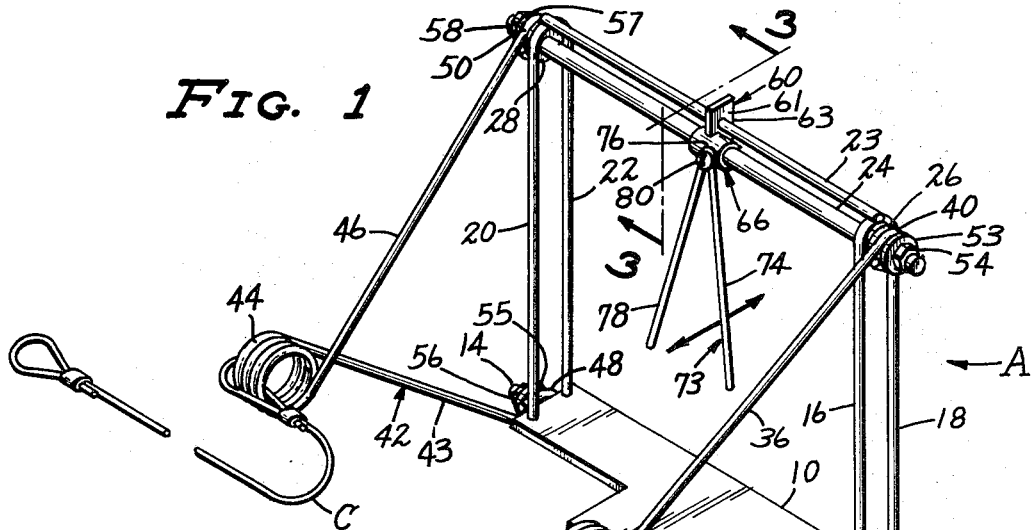

1

3,534,493
ANIMAL TRAP
Wallace L. Dahlgren, Rte. 4, Box 576,
Duluth, Minn. 55803
Continuation of application Ser. No. 753,673, Aug. 19,
1968. This application Dec. 17, 1969, Ser. No. 882,400
Int. Cl. A01m 23/30
U.S. Cl. 43—78     5 Claims

ABSTRACT OF THE DISCLOSURE

A base having a vertical guide on each end thereof, a horizontal clamping member slidably carried in said guides together with spring means for urging the clamping member upon the base. A bar connected to the top of the guides with means for releasably connecting the clamping member to the bar against the action of the spring means and means connected to and extending from said releasable connecting means for tripping the same to cause the clamping member to be moved to and in clamping engagement on the base.

This application is a continuation of Ser. No. 753,673 filed Aug. 19, 1968, now abandoned.

SUMMARY OF THE INVENTION

The invention relates to animal traps and more particularly to a trap having spaced guide means formed on a base together with a clamping member slidably mounted in the guide means and spring means for urging the bar to the base. The trap also includes means for releasably connecting the clamping member to a support bar connected to the guide means together with a pair of arms extending therefrom for tripping the releasable connecting means of the clamping member. With the spaced guide means the trap may be placed in an animal runway and as an animal passes between the guide means it contacts and moves the trip arms thereby releasing the clamping bar which clamps and traps the animal upon the base.

These and other more detailed and specific objects will be disclosed in the course of the following specification, reference being had to the accompanying drawings, in which—

FIG. 1 is a perspective view of a trap in a set condition embodying the invention.

FIG. 2 is a perspective view of the trap in a released condition.

FIG. 3 is a sectional view on the line 3—3 of FIG. 1.

FIG. 4 is an enlarged detailed fragmentary view on the line 4—4 of FIG. 2.

FIG. 5 is a sectional view on the line 5—5 of FIG. 4.

FIG. 6 is an enlarged perspective view of the release collar removed from the trap.

Referring to the drawings in detail, the trap A includes the base 10 from which extends the trunnions 12 and 14. Mounted on one end of the base 10 is the pair of vertical spaced support rods 16 and 18 which are joined at the top. Mounted on the opposite end of the base 10 is the pair of vertical spaced support rods 20 and 22 which are joined at the top. The tops of the rods 16 and 18 and the rods 20 and 22 are joined and secured by the horizontal spacer bar 23. The pair of rods 16 and 18 provide a guide as do the pair of rods 20 and 22.

Further provided is the clamping bar 24 which has secured at one end the stop 26 and at the other end the stop 28. The numeral 30 designates a first scissor spring formed of the first arm 32 which terminates at its inner end in the coil 34 which in turn terminates in the second arm 36. The outer end of the first spring arm 32 is formed with the eye 38 and the outer end of the second

2 spring arm 36 is formed with the eye 40. The numeral 42 designates a second scissor spring formed of the first arm 43 which terminates at its inner end in the coil 44 which in turn terminates in the second arm 46. The outer end of the first spring arm 43 is formed with the eye 48, and the outer end of the second spring arm is formed with the eye 50.

The eye 38 of the spring arm 32 is mounted on the trunnion 12 and secured by the washer 51 and nut 52, and the eye 40 of the spring arm 36 is mounted on the end of the bar 24 against the stop 26 by means of the washer 53 and the nut 54. The eye 48 of the spring arm 43 is mounted on the trunnion 14 and secured by the washer 55 and the nut 56, and the eye 50 of the spring arm 46 is mounted on the end of the bar 24 against stop 28 by means of the washer 57 and the nut 58. The springs 30 and 42 normally urge the clamping bar downwardly upon the base 10 as in FIG. 2.

The numeral 60 designates a hook latch including a flat body 61 with a hole 62 formed therethrough that is offset from the vertical center line of the hook body. The horizontal bar 23 is extended through the hole 62 thereby pivotally mounting the hook latch on the bar. Formed substantially on the center line of the hole 62 which center line parallels the vertical side edge 63 of the body 61 is the semicircular notch 64 adapted to receive the clamping bar 24, particularly FIG. 3.

Further provided is the collar 66 which has formed therein the slot 68. The slot 68 is formed in the wall of the collar normal to the longitudinal axis of the collar and extends approximately 170 degrees of the collar. The slot 68 forms the shoulders 65 and 67 in the collar 68. The notch 64 of hook 60 is positioned upwardly of the lower edge of the body 61 thereby forming the lower shoulder 70 and formed adjacent the upper edge of the notch 64 is the upper shoulder 72. Shoulders 70 and 72 are both parallel to the edge 63 of the body 61 and extend slightly beyond a diameter of the notch 64 and are in alignment.

Secured to the collar 66 is an extension in the form of the trip member 73 which includes the first finger 74 terminating at its upper end in the semicircular eye formation 76 which terminates in the second finger 78. The collar 66 is drilled and tapped to receive the bolt 80 extended through the eye 76 whereby the trip member is secured at the eye thereof to the collar 66 at a point opposite the slot 68. The trip fingers extend downwardly from the collar in a diverging relationship thereby covering as much as possible of the area bounded by the base 10, the bar 23 and the rods 16 and 18 and the rods 20 and 22 between which the animal passes. The base 10 is formed with a short leg 82, the trap resting on the leg 82 and the eyes 43 and 50 of the spring arms. The trap A is anchored by means of a cable C secured to a part of the trap such as the spring coil 34 and also to a tree, a stake in the ground, or the like.

The trap A is operated in the following manner. The clamping bar 24 is lifted upwardly against the urging of the springs 30 and 42 to a point where the bar 24 may be placed in the slot 64 of the latch hook 60. The bar 24 is thus held in the "set" position shown in FIGS. 1 and 3. The trap A is placed in a runway used by the animals to be trapped. As an animal moves the trip member 73 to the right when viewing FIG. 3, the collar 66 is rotated and the shoulder 65 of the slot 68 is forced against the shoulder 70 of the hook latch 60 thereby forcing the hook 60 off of the bar 24 and releasing the same. As a result the bar is brought downwardly into clamping engagement upon the base 10 due to the action of the springs 30 and 42. Further, as an animal moves the trip member 73 to the left when viewing FIG. 3, the collar 66 is rotated and the shoulder 67 of the slot 68 is forced against the shoulder 72 of the hook latch 60 thereby forcing the hook 60 off of the bar 24 and releasing the same. As a result the bar 24 is brought into clamping contact with the base 10 as described above.

It is understood that suitable modifications may be made in the structure as disclosed.

Having now therefore fully illustrated and described my invention, what I claim to be new and desire to protect by Letters Patent is:

1. A clamping trap for animals, comprising in combination:
   (a) a horizontally arranged base member including first and second ends;
   (b) a clamping member comprising a bar of circular cross section having first and second ends and arranged horizontally over the base member to assume a set position spaced above the base member and a released position adjacent the base member to clamp an animal between the clamping bar and the base member in the released position, the clamping bar including first and second spring supports;
   (c) a first vertical guide connected to and extending from the first end of the base member to guide the first end of the clamping bar;
   (d) a second vertical guide connected to and extending from the second end of the base member to guide the second end of the clamping bar;
   (e) a spacer bar horizontally arranged over the clamping bar between the first vertical guide and the second vertical guide adjacent the tops thereof to join and secure the guides;
   (f) a pair of springs, one spring arranged between the first spring support of the clamping bar and the interconnected base member, vertical guides, and horizontally arranged spacer bar, and the other spring arranged between the second spring support of the clamping bar and interconnected base member, vertical guides, and horizontally arranged spacer bar to urge the clamping bar downward from the set position to the released position;
   (g) apparatus for connecting the clamping bar to the horizontally arranged spacer bar against the action of the pair of springs to releasably maintain the clamping bar in the set position, comprising:
      (aa) a hook latch comprising a flat body with an aperture arranged to receive the horizontally arranged spacer bar offset from the vertical center line of the hook latch body and with a notch formed therein vertically below the aperture, the notch being semicircular in shape to conform to the cross section of the clamping bar and adapted to receive the clamping bar, upper and lower shoulders being formed above and below the notch which shoulders horizontally extend slightly beyond the diameter of the notch and lie substantially in vertical alignment with one another;
      (bb) a horizontally arranged collar rotatably mounted on the clamping bar, the collar having a vertically arranged slot therein with the slot extending slightly in excess of 180 degrees of the collar to thereby form an upper shoulder and a lower shoulder vertically arranged with respect to the clamping bar and of dimension to provide a mating arrangement with the upper and lower shoulders formed around the notch of the hook latch;
      (cc) at least one trip finger connected to and extending downward from the collar when the clamping bar is engaged in the set position, an animal attempting to pass between the vertical guides in a first direction engaging the downward extending trip finger to urge the trip finger forward and thereby rotate the collar upon the clamping bar in a first angular direction to engage the lower shoulder of the slot formed within the collar and the lower shoulder of the notch formed within the hook latch to thereby disengage the hook latch from the clamping bar such that the clamping bar is free to move downward under the action of the pair of springs from the set position to the released position to clamp the animal between the clamping bar and the base member, and an animal attempting to pass between the vertical guides in a second direction opposite from the first direction engaging the downward extending trip finger to urge the trip finger forward and thereby rotate the collar upon the clamping bar in a second angular direction opposite from the first angular direction to engage the upper shoulder of the slot formed within the collar and the upper shoulder of the notch formed within the hook latch to thereby disengage the hook latch from the clamping bar such that the clamping bar is free to move downward under the action of the pair of springs from the set position to the released position to clamp the animal between the clamping bar and the base member.

2. The clamping trap for animal of claim 1 wherein each of the vertical guides comprise a pair of rods extending vertically from the base member and joined together at the top, with the pair of rods spaced from each other to accommodate and guide the vertical movement of the horizontally arranged clamping bar therebetween from the set position adjacent the joint of the pair of rods to the released position adjacent the base member.

3. The clamping trap for animals of claim 2, wherein the pair of springs comprises a pair of scissor springs connected between the base member and the clamping bar.

4. The clamping trap for animals of claim 3, in which at least two trip fingers extend downwardly from the collar in a diverging relationship to thereby cover as much area bounded by the base member, the horizontally arranged bar, and the vertical guides as possible to insure that an animal passing through the trap will actuate the trip fingers.

5. The clamping trap for animals of claim 4, wherein spring supports on the base member comprise trunnions extending outward in opposite directions from each end of the base member and the spring supports of the clamping bar comprise ends of the clamping bar extending through and beyond the vertical guides on opposite sides thereof, the scissor springs extending from the trunnions upon the base member to the portion of the clamping bar extending beyond the vertical guides to thereby connect to the base member and to the clamping bar.

References Cited

UNITED STATES PATENTS

| 275,280 | 4/1883 | Sovers. |
| 432,139 | 7/1890 | Kerns. |
| 1,583,679 | 5/1926 | Elkins. |
| 3,335,517 | 8/1967 | Montgomery. |

WARNER H. CAMP, Primary Examiner

U.S. Cl. X.R.

43—85